(No Model.) 3 Sheets—Sheet 1.

C. A. DAHLBERG.
ADJUSTABLE SCAFFOLD AND ATTACHMENT THEREFOR.

No. 549,767. Patented Nov. 12, 1895.

Witnesses:
R. J. Jacker.
C. A. Duggan.

Inventor:
Carl A. Dahlberg
By Chas. C. Tillman
Atty.

(No Model.) 3 Sheets—Sheet 2.
C. A. DAHLBERG.
ADJUSTABLE SCAFFOLD AND ATTACHMENT THEREFOR.
No. 549,767. Patented Nov. 12, 1895.
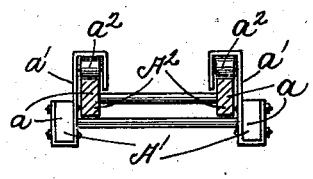
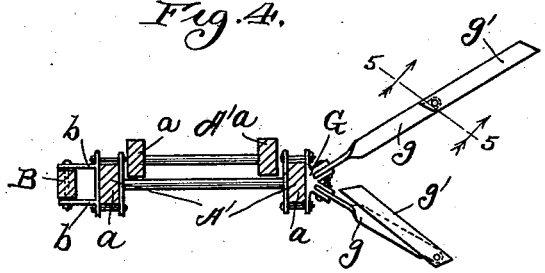
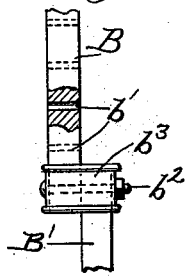
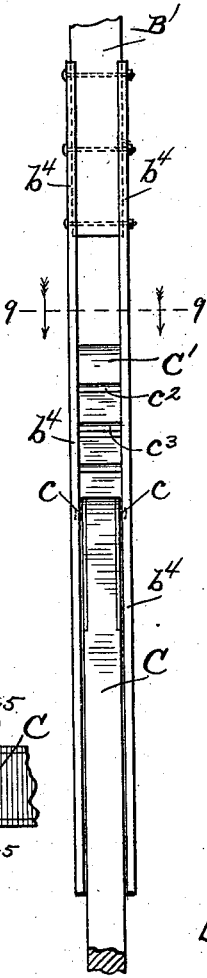
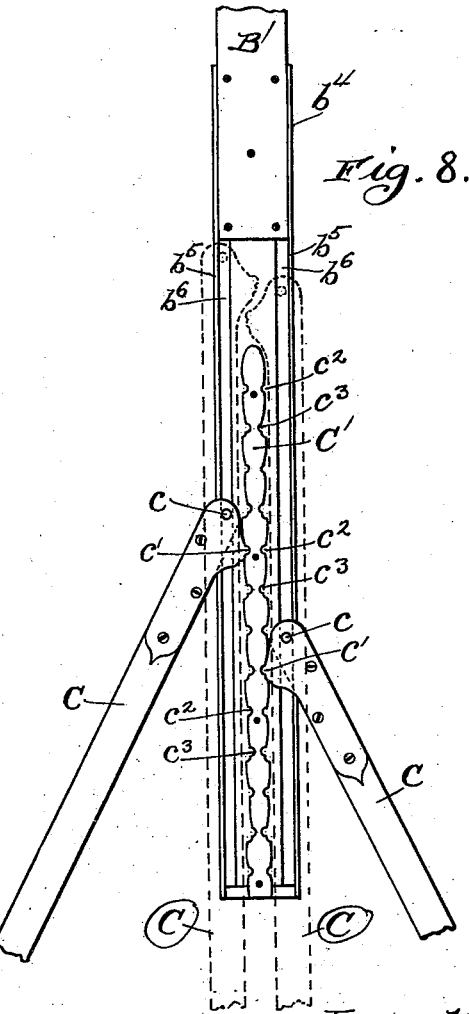
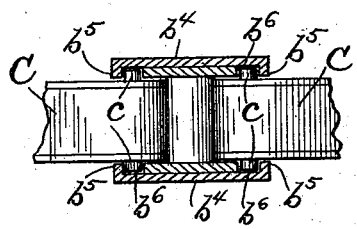

(No Model.) 3 Sheets—Sheet 3.
C. A. DAHLBERG.
ADJUSTABLE SCAFFOLD AND ATTACHMENT THEREFOR.
No. 549,767. Patented Nov. 12, 1895.
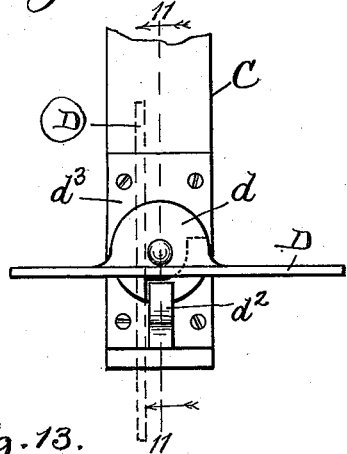
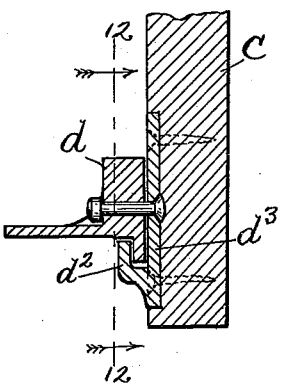
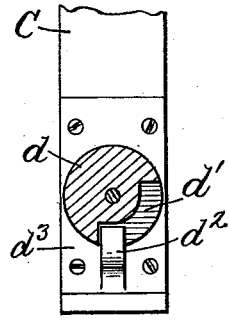
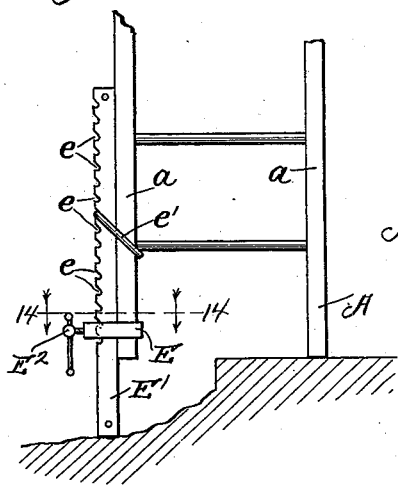
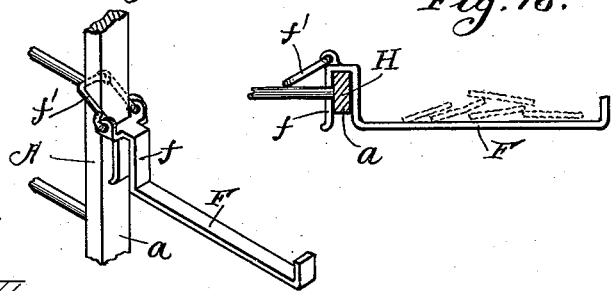
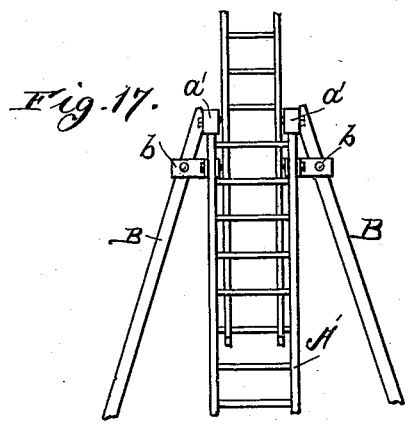
Witnesses:
R. J. Jacker.
C. T. Duggan.
Inventor:
Carl A. Dahlberg
By Chas. C. Tillman
Atty.
ANDREW B.GRAHAM. PHOTO-LITHO. WASHINGTON, D.C.

UNITED STATES PATENT OFFICE.

CARL A. DAHLBERG, OF CHICAGO, ILLINOIS.

ADJUSTABLE SCAFFOLD AND ATTACHMENT THEREFOR.

SPECIFICATION forming part of Letters Patent No. 549,767, dated November 12, 1895.

Application filed March 28, 1895. Serial No. 543,453. (No model.)

*To all whom it may concern:*

Be it known that I, CARL A. DAHLBERG, a citizen of the United States, residing at Chicago, in the county of Cook and State of Illinois, have invented certain new and useful Improvements in Adjustable Scaffolds and Attachments Therefor, of which the following is a specification.

This invention relates to improvements in scaffolds, and is more especially adapted to be employed on portable scaffolds—such as are used by painters, carpenters, calciminers, and other artisans of a like character; and it consists in certain peculiarities of the construction, novel arrangement, and operation of the various parts thereof, as will be hereinafter more fully set forth and specifically claimed.

The objects of my invention are, first, to provide a scaffold which shall be simple and inexpensive in construction, strong and durable, and effective in operation; second, such a scaffold which may be readily placed in position for use, the parts of which will be so braced and supported as to render the scaffold safe and secure; third, a scaffold which may be vertically adjusted to suit the requirements of the user, and, fourth, to provide a means whereby the supporting portions of the scaffold may be adjusted to uneven surfaces and also be prevented from sinking into the earth.

In order to enable others skilled in the art to which my invention pertains to make and use the same, I will now proceed to describe it, referring to the accompanying drawings, in which—

Figure 2:
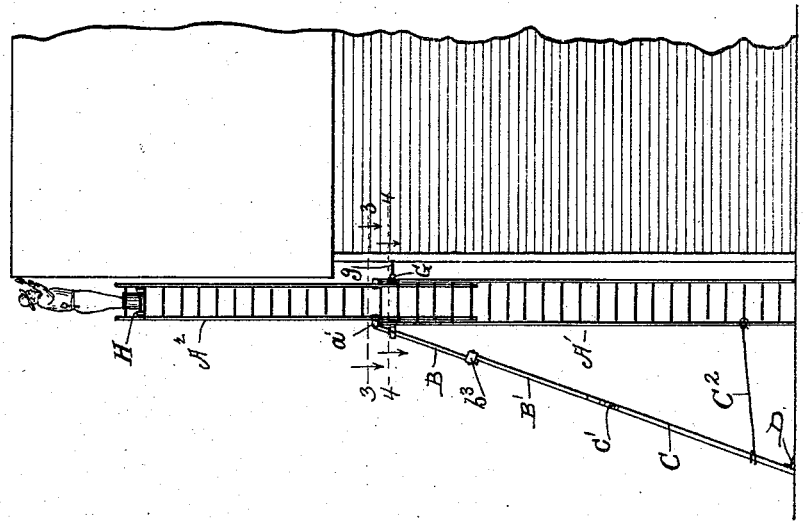
Figure 1:
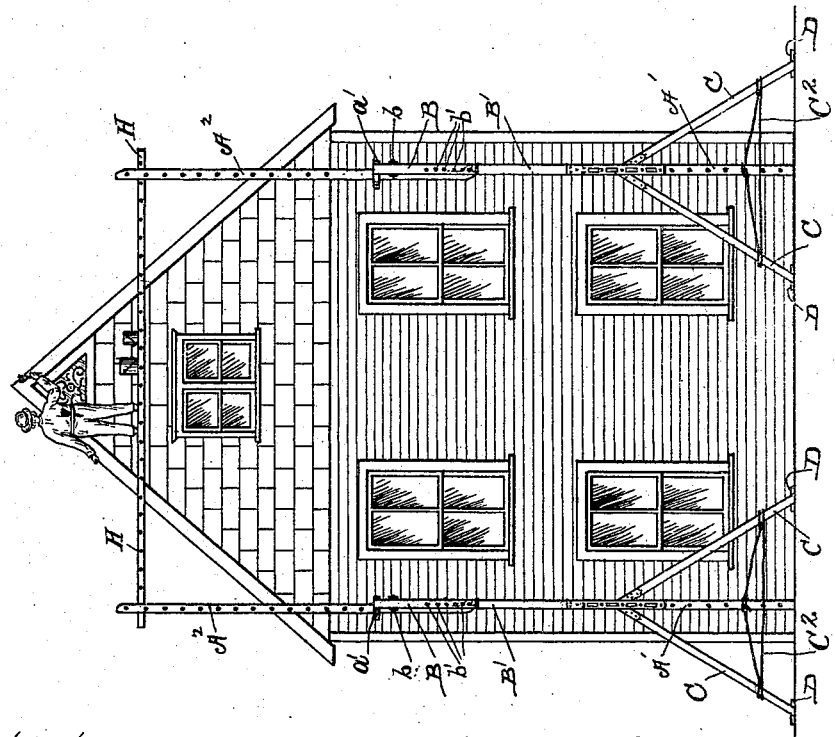

Figure 1 is a view in front elevation of my scaffold as it appears when being used by a house-painter. Fig. 2 is a view in side elevation of my scaffold and a portion of the house. Fig. 3 is a plan sectional view taken on line 3 3 of Fig. 2, to show the method of adjustably connecting two of the supporting-ladders. Fig. 4 is a similar view taken on line 4 4 of Fig. 2, showing a portion of the adjustable supporting-ladders and the ground and wall-braces therefor. Fig. 5 is a cross-sectional view taken on line 5 5 of Fig. 4 of one of the arms of the wall-brace. Fig. 6 is a view partly in section of a portion of the extension-pieces of one of the ground-braces, showing the method of connecting the same together. Fig. 7 is an edge view of a portion of one of the ground-braces. Fig. 8 is a front view of a portion of one of the braces with the face-plate thereof removed. Fig. 9 is a plan sectional view taken on line 9 9 of Fig. 7. Fig. 10 is a view in elevation of the lower part of one of the legs of the ground-braces, showing a pivoted foot thereon to prevent the leg from sinking in the soft earth. Fig. 11 is a sectional view taken on line 11 11 of Fig. 10. Fig. 12 is a sectional view taken on line 12 12 of Fig. 11. Fig. 13 is a view in elevation of the lower portion of one of the supporting-ladders, showing the same supplied with a device for adjusting it to uneven surfaces. Fig. 14 is a plan sectional view taken on line 14 14 of Fig. 13. Fig. 15 is a perspective view of a portion of a ladder and a bracket secured thereto for the support of lumber when the scaffold is used by carpenters. Fig. 16 is a view in elevation of said bracket, showing the manner of securing the same to a horizontal ladder; and Fig. 17 is a view in elevation illustrating one of my extension-ladders provided with braces on either side thereof as it appears when designed to be used by calciminers, plasterers, or for overhead work.

Similar letters refer to like parts throughout the different views of the drawings.

A represents the extension or supporting ladders of my scaffold, which are or may be made of the ordinary or any preferred kind, but usually in two or more sections $A'$ and $A^2$, the latter or upper ladder $A^2$ being somewhat narrower than the former or lower one, so as to fit and operate between the rails $a$ thereof, as will be clearly understood by reference to Fig. 3 of the drawings. The sections of the extension-ladders used in my scaffold may be adjustably secured together in any desired manner; but I usually employ straps $a'$, which are substantially S-shaped, as shown in Fig. 3 of the drawings, except that the loops are rectangular instead of being curved or bent. One of these loops (the external one) is secured by means of bolts to the upper portion of the rails $a$ of the lower ladder, and the internal loop is provided with antifriction-rollers $a^2$ and overlaps the rails $a$ of the upper ladder, thus allowing the ladder to be raised or lowered between the rails of the lower one and secured in any desired manner at a proper position. To one of the rails $a$ of the lower ladder is secured a bracket $b$, to the outer portion of which is pivotally connected the upper section B of the extension ground-brace. This piece B is provided in its lower part with transverse openings $b'$ for the reception of a bolt $b^2$, which is passed through a collar $b^3$ and the upper portion of the lower section B' of said extension ground-brace. The collar $b^3$, embracing the pieces B and B', allows them to be adjusted by removing the bolt $b^2$ and again inserting it into the desired opening $b'$ of the upper piece. The piece $b'$ is provided on its face and back with plates $b^4$, which are formed with inwardly-projecting flanges $b^5$ to form a track or guide way $b^6$ for the reception and operation of the transversely-projecting lugs $c$ on the upper portions of the ground-brace legs C, which are provided on their adjacent sides, near their upper end, with projections $c'$ to engage the recesses $c^2$ and $c^3$ in the piece or block C', which is located between the plates $c^4$ and secured to the piece B', as before stated.

By reference to Fig. 8 of the drawings it will be seen and readily understood that the projections $c'$ on the legs C are cam-shaped and are so located relative to the upper ends of the legs that by raising the same toward a horizontal position they will be disengaged from the recesses and may be placed in the positions indicated by dotted lines in said figure when it is desired, or may be lowered to the positions indicated by continuous lines when they are to be used as braces for the supporting-ladder. It is sometimes desirable to place one or both of the legs C, when being used as a brace, as nearly vertical with the piece B' as possible, and for this reason the piece C' is formed with alternating recesses $c^2$ and $c^3$, the latter of which are formed deeper into the piece C', thus allowing the projection on the leg C to extend farther inwardly and the leg to be placed closer or nearer in alignment to the piece. The lower part of each of the legs C is provided with a foot D, one edge of which is formed with a disk $d$, through which is passed a pin $d'$ to pivotally secure the same to the leg. The disk $d$ is formed with a recess or cut-away portion $d'$, extending about one-quarter part of its periphery, and is adapted to receive a lug $d^2$ on the plate $d^3$, secured to the lower portion of the leg. This lug, fitting within the recess $d'$, allows the foot D to be turned to the position indicated by dotted lines in Fig. 10 of the drawings when the parts are folded and not required for use; but when it is desired to use the leg the foot is placed in a horizontal position, as shown by continuous lines in Fig. 10, when it is obvious it will prevent the leg sinking in soft earth.

In Fig. 13 of the drawings I have illustrated a device to be applied to my scaffold which is designed to adjust the supporting-ladder to uneven surfaces; and it consists in employing a strap or collar E, which encompasses one of the rails $a$ of the ladder, and a piece E', having a series of notches $e$ in its outer surface. These notches are designed to engage a strap $e'$, which is placed beneath the lower rung of the ladder and in one of the series of notches thereof. The strap or collar E is provided with a set-screw $E^2$ in its outer surface, in order to clamp the piece E' and the rail $a$ of the ladder together, as is apparent.

In Figs. 15 and 16 I have illustrated an attachment which I may sometimes employ with my scaffold which is designed to be used by carpenters for the reception of lumber; and it consists of a bracket F, which has its free end slightly upturned and is formed at its inner end with a rectangular-shaped hook $f$ to engage one of the rails of the ladder that is placed horizontally on the upright or supporting ladders. The upper portion of the hook $f$ may be provided with link-hooks $f'$ to engage the rail $a$ of one of the upright ladders, as is clearly shown in Fig. 15 of the drawings.

When using my scaffold near the wall of a house, it is frequently desirable to brace the extension-ladder thereagainst, and in order to do this I provide the rails $a$ adjacent to the wall with a bracket G, to which are pivotally connected one or more arms $g$, which when not in use may be folded to the side of the rail by raising them. The arms $g$ are preferably made in sections $g$ and $g'$, as shown in Fig. 4 of the drawings, in order that they may be folded or extended, as illustrated in said figure, and as the requirements of the position of the ladder from the wall may demand.

In Fig. 17 of the drawings I have illustrated an extension or supporting ladder with my braces, as above described, connected thereto on each side, and this ladder is especially designed to be used on scaffolds employed for overhead work.

From the foregoing and by reference to the drawings it will be seen and readily understood that I employ two extension or supporting ladders with the adjustable braces, and place on them, so as to reach horizontally from one ladder to the other, a platform or ladder H, upon which the user may stand and may rest his tools, utensils, and other articles. It is obvious that the supporting or extension ladders A may be made of any number of sections or extended to any desired height. It is also apparent that when my scaffold is not in use the parts thereof may be folded together in a compact form, thus rendering it an easy matter to transfer them from one place to another, the legs C being connected together by means of the cord $C^2$, which prevents them from diverging for too great a distance.

Having thus fully described my invention, what I claim as new, and desire to secure by Letters Patent, is—

1. The combination of a pair of extension supporting ladders, with a ground brace piece pivotally secured to one of the rails of each, and a leg adjustably secured on each side of said piece and adapted to engage therewith, and an arm pivoted to the other rail of each of the ladders and adapted to impinge the wall, substantially as described.

2. The combination with a ladder of a piece pivotally secured to one of the rails thereof, said piece being provided on its sides with guide-ways and a series of recesses or depressions, a leg having a transversely projecting pin to fit and operate in each of the guide-ways, and a projection to engage the recesses or depressions, substantially as described.

3. The combination of a pair of extension supporting ladders, with a ground brace piece pivotally secured to one of the rails of each, said piece being provided on its sides with a series of recesses or depressions, and a guide-way or groove, a leg in the guide-way, and a projection to engage the recesses or depressions, and a pivoted foot located on the lower portion of each of said legs, substantially as described.

4. The combination of the extension supporting ladders A, with the ground brace piece B, pivoted to one of the rails thereof, the piece B', adjustably secured to the piece B, and having the plates $b^4$, provided with flanges $b^5$, to form grooves or guide-ways $b^6$, the piece C', having the recesses $c^2$, and $c^3$, the legs C, provided with the pins $c$, to operate in the grooves $b^6$, and the projections $c'$, to engage the recesses in the piece C', all constructed, arranged and operating substantially as and for the purpose set forth.

CARL A. DAHLBERG.

Witnesses:
    CHAS. C. TILLMAN,
    E. A. DUGGAN.